US012514558B2

(12) United States Patent
Sun et al.

(10) Patent No.: US 12,514,558 B2
(45) Date of Patent: Jan. 6, 2026

(54) METHOD FOR DETECTING BIOLOGICAL SIGNS BASED ON ULTRASONIC DETECTION SYSTEM

(71) Applicant: Wuxi Hisky Medical Technologies Co., Ltd., Wuxi (CN)

(72) Inventors: Shibo Sun, Wuxi (CN); Qiong He, Wuxi (CN); Kai Xu, Wuxi (CN); Jinhua Shao, Wuxi (CN); Jin Sun, Wuxi (CN); Houli Duan, Wuxi (CN)

(73) Assignee: Wuxi Hisky Medical Technologies Co., Ltd., Wuxi (CN)

( * ) Notice: Subject to any disclaimer, the term of this patent is extended or adjusted under 35 U.S.C. 154(b) by 551 days.

(21) Appl. No.: 17/743,257

(22) Filed: May 12, 2022

(65) Prior Publication Data
US 2022/0265246 A1    Aug. 25, 2022

Related U.S. Application Data

(63) Continuation of application No. PCT/CN2020/126709, filed on Nov. 5, 2020.

(30) Foreign Application Priority Data

Nov. 12, 2019   (CN) .......................... 201911098005.1

(51) Int. Cl.
*A61B 8/08*     (2006.01)
*A61B 8/00*     (2006.01)
*A61B 90/90*    (2016.01)

(52) U.S. Cl.
CPC ............ *A61B 8/485* (2013.01); *A61B 8/5207* (2013.01); *A61B 8/54* (2013.01); *A61B 90/90* (2016.02)

(58) Field of Classification Search
CPC ......... A61B 8/485; A61B 8/5207; A61B 8/54; A61B 90/90; A61B 8/4444; A61B 8/4461;
(Continued)

(56) References Cited

U.S. PATENT DOCUMENTS 5,088,496 A    2/1992  Bernard
5,810,731 A    9/1998  Sarvazyan
(Continued)

FOREIGN PATENT DOCUMENTS

CN    101474083 A    7/2009
CN    201767983 U    3/2011
(Continued)

OTHER PUBLICATIONS

Michael Wang et al. "On the precision of time-of-flight shear wave speed estimation in homogeneous soft solids: initial results using a matrix array transducer", IEEE Transactions on Ultrasonics, Ferroelectrics, and Frequency Control, IEEE, USA, vol. 60, No. 4, (Apr. 1, 2013) pp. 758-770, (Year: 2013).*

(Continued)

*Primary Examiner* — Kaitlyn E Sebastian
(74) *Attorney, Agent, or Firm* — J.C. PATENTS

(57) ABSTRACT

A method for detecting biological signs based on an ultrasonic detection system includes: sending, by a second processing module, a detection instruction to a master processing module in a first processing module; generating, by the master processing module, a first synchronization signal based on the detection instruction, and sending the first synchronization signal to a synchronous distribution module, so as to make the synchronous distribution module send the first synchronization signal to the master processing module and a slave processing module in the first processing module, and enable the slave processing module and the (Continued)

master processing module to control array elements to which they are respectively connected to transmit an ultrasonic wave simultaneously based on the first synchronization signal and collect an echo signal; and processing, by the second processing module, the echo signal collected by each array element to obtain information about the biological signs of an organism.

20 Claims, 3 Drawing Sheets

(58) Field of Classification Search
CPC ............ G01S 7/52042; G01S 15/8915; G01S 15/8927
See application file for complete search history.

(56) References Cited

U.S. PATENT DOCUMENTS

| | | | |
|---|---|---|---|
| 2012/0071762 A1* | 3/2012 | Sato | A61B 8/4483 600/459 |
| 2014/0343429 A1 | 11/2014 | Jensen | |
| 2016/0183918 A1 | 6/2016 | Yang | |
| 2017/0176581 A1 | 6/2017 | Ku | |
| 2018/0210632 A1 | 7/2018 | Schmied | |
| 2019/0282216 A1 | 9/2019 | Kantor | |
| 2020/0077985 A1* | 3/2020 | Hope Simpson ... | G01S 15/8922 |

FOREIGN PATENT DOCUMENTS

| | | |
|---|---|---|
| CN | 102113899 A | 7/2011 |
| CN | 102293669 A | 12/2011 |
| CN | 102599931 A | 7/2012 |
| CN | 102813530 A | 12/2012 |
| CN | 103698747 A | 4/2014 |
| CN | 103917167 A | 7/2014 |
| CN | 104519960 A | 4/2015 |
| CN | 104706381 A | 6/2015 |
| CN | 105188557 A | 12/2015 |
| CN | 105411622 A | 3/2016 |
| CN | 205458786 U | 8/2016 |
| CN | 206063170 U | 4/2017 |
| CN | 108272469 A | 7/2018 |
| CN | 108836384 A | 11/2018 |
| CN | 109164171 A | 1/2019 |
| CN | 109805958 A | 5/2019 |
| CN | 110301938 A | 10/2019 |
| CN | 110301939 A | 10/2019 |
| CN | 110720948 A | 1/2020 |
| JP | 2006020889 A | 1/2006 |
| JP | 2010501231 A | 1/2010 |
| JP | 2011110432 A | 6/2011 |
| JP | 2015508012 A | 3/2015 |
| JP | 2015515923 A | 6/2015 |
| JP | 2019187777 A | 10/2019 |
| WO | WO2018177991 A1 | 10/2018 |
| WO | WO2018178379 A1 | 10/2018 |
| WO | WO2019191009 A1 | 10/2019 |

OTHER PUBLICATIONS

First Office Action of the parallel application JP2022-527784.
International Search Report of PCT/CN2020/126709.
First Office Action of the priority CN application 201911098005.1.
Second Office Action of the priority CN application 201911098005.1.
Notice of Allowance of the priority CN application 201911098005.1.
Extended European Search Report of the parallel application of EP20886437.1.
Search Report of the parallel application IN202217027826.
NPL: "On the Precision of Time-of-Flight Shear Wave Speed Estimation in Homogeneous Soft Solids Initial Results Using a Matrix Array transducer", IEEE Transactions on Ultrasonics, Ferroelectrics, and Frequency Control, IEEE, USA, vol. 60, No. 4, Apr. 1, 2013, pp. 758-770.

* cited by examiner

METHOD FOR DETECTING BIOLOGICAL SIGNS BASED ON ULTRASONIC DETECTION SYSTEM

CROSS-REFERENCE TO RELATED APPLICATIONS

This application is a continuation of International Application No. PCT/CN2020/126709, filed on Nov. 5, 2020, which claims priority to Chinese Patent Application No. 201911098005.1, filed on Nov. 12, 2019. Both of the above applications are hereby incorporated by reference in their entireties.

TECHNICAL FIELD

Embodiments of the present application relate to the technical field of ultrasonic imaging, and in particular, to a method for detecting biological signs based on an ultrasonic detection system.

BACKGROUND

The elasticity and viscosity of tissues are important characterizations of an organism, and accordingly a lot of information can be modulated into various parameters of a shear wave.

An ultrasonic wave has advantages of being non-destructive, non-ionizing and non-radiating, and thus is widely used in a medical field.

The ultrasonic wave is utilized to quantitatively detect information about parameters of a shear wave, and then information about the viscosity and elasticity of tissues, especially information about the elasticity, is obtained. Currently, the most widely used and the most successful device is a transient elastography device, but this device has only one array element and one channel, and can only obtain information in one direction at a time.

However, the thirst of medical researchers for more dimensional information becomes more and more urgent.

Therefore, there is currently no good way regarding how to obtain a technique which quantitatively detects a shear wave with the ultrasonic wave, extends to multiple array elements and multiple channels, and is easy to be extended, thereby achieving the detection of viscoelasticity in two-dimensional and even multi-dimensional directions.

SUMMARY

Embodiments of the present application provide a method for detecting biological signs based on an ultrasonic detection system, in order to simultaneously detect signs of an organism in multiple dimensions through multiple array elements.

Embodiments of the present application provide a method for detecting biological signs based on an ultrasonic detection system, the ultrasonic detection system suitable for the method includes: an ultrasonic probe, a first processing module, a second processing module and a synchronous distribution module; where the ultrasonic probe includes at least two array elements, and the first processing module includes a master processing module and at least one slave processing module. The method includes:
sending, by the second processing module, a detection instruction to the master processing module; generating, by the master processing module, a first synchronization signal based on the detection instruction, and sending the first synchronization signal to the synchronous distribution module, so as to make the synchronous distribution module send the first synchronization signal to the master processing module and the slave processing module in the first processing module; controlling, by the slave processing module and the master processing module, the array elements respectively connected with the slave processing module and the master processing module to transmit an ultrasonic wave based on the first synchronization signal, and collecting at least 20 frames of an echo signal of the ultrasonic wave, where the echo signal has a pulse repetition frequency within a range of 10 Hz-40,000 Hz; and processing, by the second processing module, the echo signal collected to obtain information about biological signs of an organism.

In an implementation, before the sending, by the second processing module, the detection instruction to the master processing module, the method further includes: configuring, by the second processing module, a control parameter for the master processing module and the slave processing module, so as to make the master processing module and the slave processing module control the array elements to which they are respectively connected based on the control parameter.

In an implementation, the control parameter includes a first parameter for controlling the array elements to generate a shear wave.

In an implementation, the shear wave generated based on the first parameter has a time duration between 1 μs and 1 s and a vibration frequency between 10 Hz and 100,000,000 Hz.

In an implementation, after the configuring, by the second processing module, the control parameter for the master processing module and the slave processing module, the method further includes:
sending, by the second processing module, an excitation instruction to the master processing module; generating, by the master processing module, a second synchronization signal based on the excitation instruction, and sending the second synchronization signal to the synchronous distribution module, so as to make the synchronous distribution module send the second synchronization signal to the master processing module and the slave processing module in the first processing module; and controlling, by the slave processing module and the master processing module, the array elements respectively connected with the slave processing module and the master processing module to generate the shear wave based on the first parameter, on the basis of the second synchronization signal.

In an implementation, the controlling, by the slave processing module and the master processing module, the array elements respectively connected with the slave processing module and the master processing module to generate the shear wave is implemented in one of following manners: single-point acoustic radiation force impulse, multi-point Mach cone, multi-point comb wave, and multi-point surface wave.

In an implementation, the control parameter includes a second parameter for controlling the array elements to generate the ultrasonic wave.

In an implementation, before the configuring, by the second processing module, the control parameter for the master processing module and the slave processing module, the method further includes: acquiring, by the second processing module, an identity information of each module in the first processing module, and identifying the master processing module and the slave processing module based on the identity information of each module.

In an implementation, the identity information includes an identity label and mode information, the identifying the master processing module and the slave processing module based on the identity information of each module including: performing, for each module in the first processing module, a verification on an identity of the module based on the identity label of the module; and determining whether the module is the master processing module or the slave processing module based on the mode information of the module in response to the verification being successful.

In an implementation, the identity information includes at least one of the following: a manufacturer identification code, a device identification code, and an auxiliary identification code.

In an implementation, the ultrasonic detection system further includes a mechanical vibration device; before the sending, by the second processing module, a detection instruction to the master processing module, the method further includes: sending, by the second processing module, an excitation signal to the mechanical vibration device, so as to make the mechanical vibration device generate a shear wave.

In this embodiment, the second processing module is configured to send a detection instruction to the master processing module in the first processing module, and the master processing module generates a first synchronization signal based on the detection instruction, and sends the first synchronization signal to the synchronous distribution module, so that the synchronous distribution module transmits the first synchronization signal to the master processing module and the slave processing module in the first processing module, and thus the slave processing module and the master processing module can control array elements to which they are respectively connected to transmit an ultrasonic wave simultaneously based on the first synchronization signal, and collect an echo signal; and the second processing module processes the echo signal collected by each array element to obtain information about the biological signs of an organism. Since the embodiments of the present application can simultaneously transmit the ultrasonic wave through multiple array elements, and process the echo signal collected by multiple array elements, an organism may be detected in multiple dimensions simultaneously, thereby improving the detection efficiency.

BRIEF DESCRIPTION OF THE DRAWINGS

In order to illustrate technical solutions in embodiments of the present application or in the prior art more clearly, the following will briefly introduce the drawings which are required to be used in the description of the embodiments or the prior art. Obviously, the drawings in the following description are only some embodiments of the present application, and those skilled in the art can also obtain other drawings based on these drawings without paying any creative work.

DESCRIPTION OF EMBODIMENTS

The technical solutions in the embodiments of the present application will be explicitly and completely described below with reference to the drawings in the embodiments of the present application. Obviously, the described embodiments are only a part rather than all embodiments of the present application. Based on the embodiments of the present application, all other embodiments obtained by those skilled in the art without creative efforts shall fall within the protection scope of the present application.

The terms "include/comprise" and "have/has" and any variations thereof in the specification and claims of the present application are intended to encompass non-exclusive inclusion. For example, a process including a series of steps or a device including a series of structures does not have to be limited to those structures or steps listed explicitly, but may include other steps or structures that are not explicitly listed or are inherent to such process or device.

Figure 1:
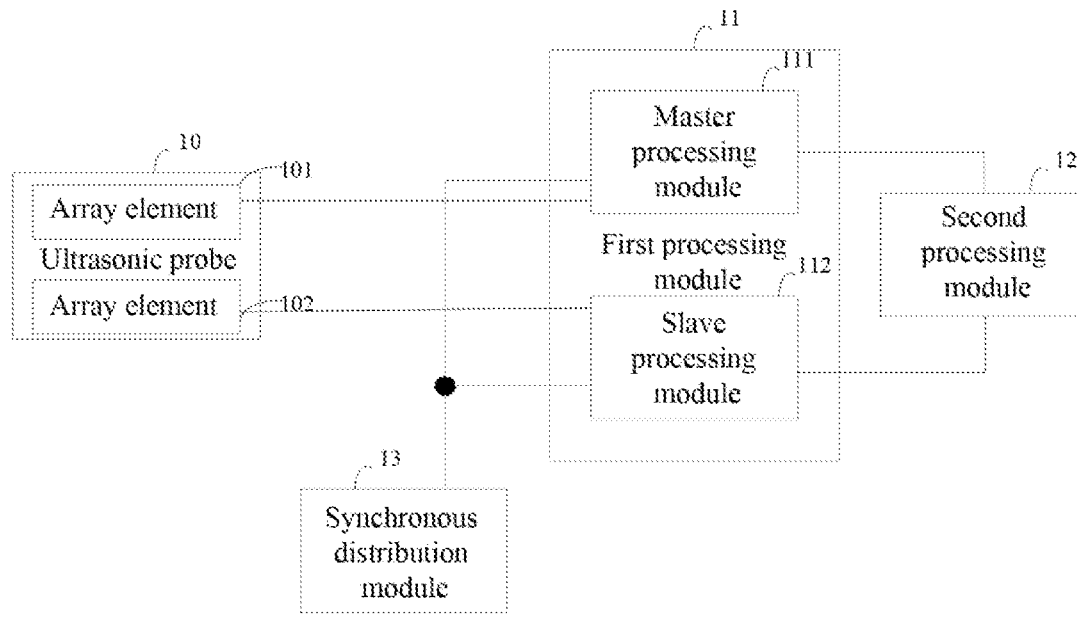
FIG. 1 is a schematic structural diagram of an ultrasonic detection system provided by an embodiment of the present application.
Figure 2:
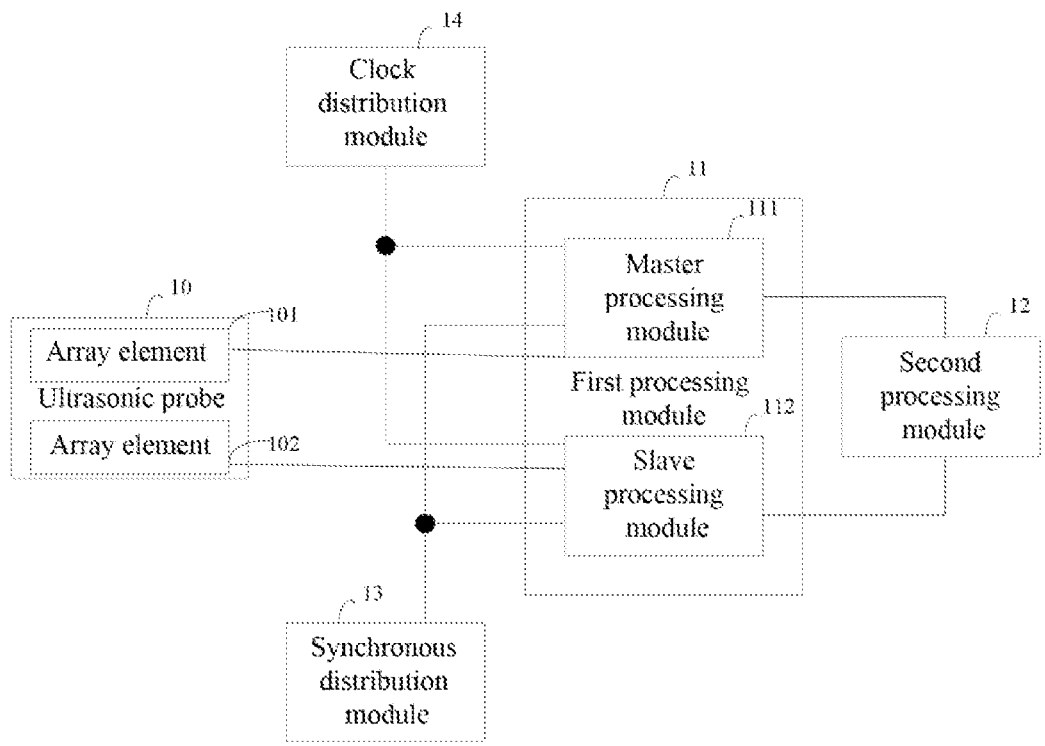
FIG. 2 is a schematic structural diagram of an ultrasonic detection system provided by an embodiment of the present application.

FIG. 1 is a schematic structural diagram of an ultrasonic detection system provided by an embodiment of the present application. As shown in FIG. 1, exemplarily, the ultrasonic detection system includes an ultrasonic probe 10, a first processing module 11, a second processing module 12 and a synchronous distribution module 13, where the ultrasonic probe 10 includes an array element 101 and an array element 102, and the first processing module 11 includes a master processing module 111 and a slave processing module 112; the array element 101 is connected with the master processing module 111, the array element 102 is connected with the slave processing module 112, and the master processing module 111 and the slave processing module 112 are each connected with both the synchronous distribution module 13 and the second processing module 12. The synchronous distribution module 13 is configured to distribute a synchronization signal to the master processing module 111 and the slave processing module 112 based on triggering of the master processing module 111. The master processing module 111 and the slave processing module 112 are respectively configured to control the array element 101 and the array element 102 to simultaneously transmit a detection signal (e.g., an ultrasonic wave) in different dimensional directions of an organism, and collect an echo signal of the detection signal. The second processing module 12 is configured to process the echo signal, so as to obtain information about the biological signs of an organism in different dimensions. In the system shown in FIG. 1, clock signals of the master processing module 111 and the slave processing module 112 may be generated by the master processing module 111 and the slave processing module 112 themselves. In this case, when the system is initialized, it is required to synchronize and calibrate clocks of the master processing module 111 and the slave processing module 112. Alternatively, as shown in FIG. 2, in some embodiments, based on the structure shown in FIG. 1, the ultrasonic detection system may further include a clock distribution module 14, where the clock distribution module 14 is configured to distribute clocks to the master processing module 111 and the slave processing module 112. Certainly, FIG. 1 and FIG. 2 are just exemplary illustrations and are not the unique limitations to the ultrasonic detection system described in the embodiments of the present application. In fact, in the ultrasonic detection system described in the embodiments of the present application, the ultrasonic probe 10 may include two or more array elements; the first processing module 11 may include one master processing module 111 and one or more slave processing modules 112, where each array element is connected with one master processing module 111 or one slave processing module 112, and the master processing module 111 and the slave processing module 112 may be connected with multiple array elements, respectively.

Figure 3:
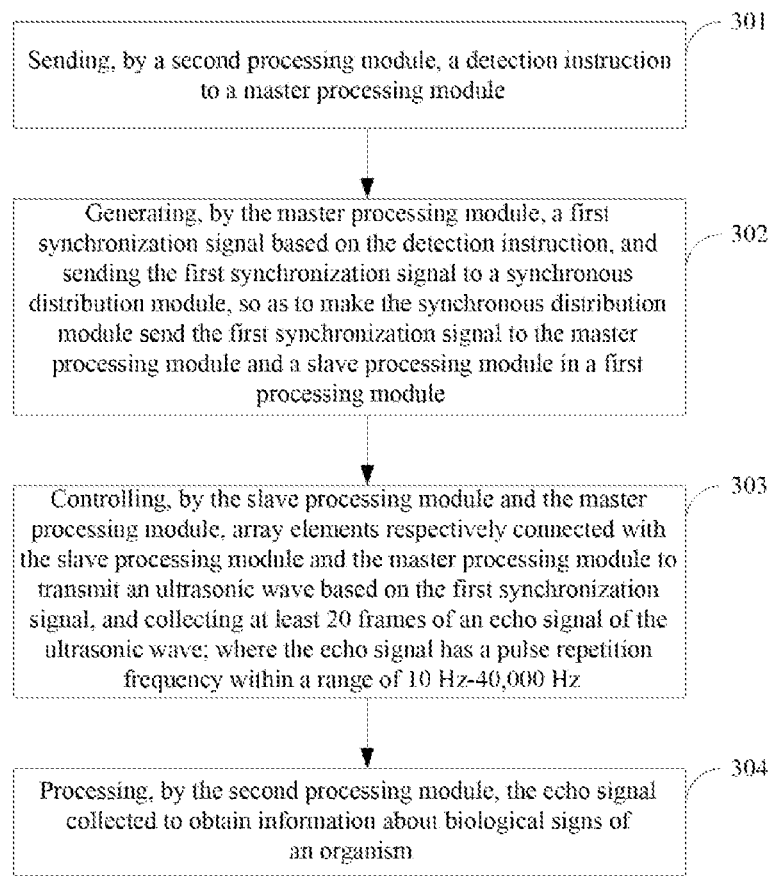
FIG. 3 is a flow chart of a method for detecting biological signs based on an ultrasonic detection system provided by an embodiment of the present application.

Based on the above ultrasonic detection system, embodiments of the present application provide a method for detecting biological signs based on an ultrasonic detection system, in order to detect information about the signs of an organism in multiple dimensions through multiple array elements. Exemplarily, FIG. 3 is a flow chart of a method for detecting biological signs based on an ultrasonic detection system provided by an embodiment of the present application. As shown in FIG. 3, the method includes the following steps.

At step 301, a detection instruction is sent by the second processing module 12 to the master processing module 111.

In this embodiment, a mode information and address information of each module in a first processing module 11 are prestored in a second processing module 12, where the mode information of each module is configured to indicate that each module is either a master processing module 111 or a slave processing module 112.

When performing a detection operation, the second processing module 12 acquires an address of the master processing module 111, and sends a detection instruction to the master processing module 111 based on the address.

At step 302, a first synchronization signal is generated by the master processing module 111 based on the detection instruction, and is sent to a synchronous distribution module 13, so that the synchronous distribution module 13 sends the first synchronization signal to the master processing module 111 and the slave processing module 112 in the first processing module 11.

In this embodiment, in order to achieve the simultaneous detection of multiple dimensions of an organism, when the detection operation is performed, it is necessary to trigger multiple array elements in the ultrasonic probe 10 to operate simultaneously. In this case, after the detection instruction is received by the master processing module 111, the synchronization signal for the multiple array elements is generated by the master processing module 111 and is distributed by the synchronous distribution module 13 to the master processing module 111 and the slave processing module 112 in the first processing module 11.

At step 303, the slave processing module 112 and the master processing module 111 are configured to control array elements to which they are respectively connected to transmit an ultrasonic wave based on the first synchronization signal, and collect at least 20 frames of an echo signal of the ultrasonic wave; where a pulse repetition frequency of the echo signal is within a frequency range of 10 Hz-40,000 Hz.

In this embodiment, prior to sending a detection instruction to the master processing module 111, the second processing module 12 may configure a control parameter for the master processing module 111 and the slave processing module 112 in the first processing module 11 in advance.

The control parameter of the master processing module 111 may be the same as or different from that of the slave processing module 112, and the master processing module 111 and the slave processing module 112 control the array elements to which they are respectively connected based on the control parameter.

In this embodiment, the control parameter (for the convenience of distinguishing, hereinafter referred to as a second parameter for short) includes parameters such as energy level of ultrasonic excitation, frequency of the ultrasonic excitation, and aperture of the ultrasonic excitation. The master processing module 111 and the slave processing module 112 control the array elements to which they are respectively connected to transmit an ultrasonic wave with a target characteristic, based on the second parameter. In other words, the second processing module 12 in this embodiment may achieve the control of the outputted ultrasonic wave by configuring and adjusting the second parameter.

It should be noted here that the configuration of the second parameter in this embodiment may be associated with the characteristics of the shear wave for target detection, so that the obtained ultrasonic wave can be used to detect the shear wave well.

In order to facilitate the understanding, in this embodiment, it may be exemplarily understood that the shear wave carrying information about the biological signs of an organism is generated by spontaneous vibration inside the tissues of the organism. After the slave processing module 112 receives the first synchronization signal distributed by the synchronous distribution module 13, the slave processing module 112 and the master processing module 111 use the second parameter configured by the second processing module 12 to control the array elements to which they are respectively connected, based on the first synchronization signal, so as to make the array elements transmit the corresponding ultrasonic wave, and receive the echo signal of the ultrasonic wave.

In other embodiments, the shear wave described in this embodiment may also be generated by external vibration. For example, in an implementation, the ultrasonic detection system may be provided with a mechanical vibration device, which is connected with the second processing module 12. Before the second processing module 12 performs the action of step 301, the second processing module 12 sends an excitation signal to the mechanical vibration device, so that the mechanical vibration device generates a corresponding shear wave under the excitation of the excitation signal. In this case, the structure of the mechanical vibration device may be arranged as required, and is not unique. In another embodiment, the shear wave may also be generated by the array elements in the ultrasonic probe 10, in this implementation, the control parameter configured by the second processing module 12 for the master processing module 111 and the slave processing module 112 may further include a relevant parameter (for the convenience of distinguishing, hereinafter referred to as a first parameter for short) for generating the shear wave. The master processing module 111 and the slave processing module 112 control the array elements to generate respective shear waves based on the first parameter. Exemplarily, the movement speed of tissues caused by the shear wave may be between 1 nm/s and 10 m/s, and the movement range of tissues may be between 0.01 μm and 10 mm.

Figure 4:
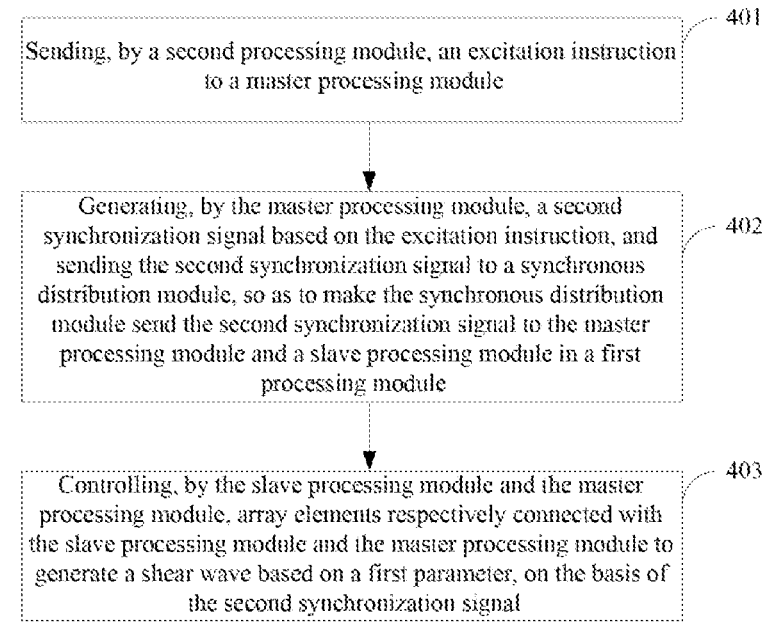
FIG. 4 is a flow chart of a method of excitation of a shear wave provided by an embodiment of the present application.

Exemplarily, FIG. 4 is a flow chart of a method of excitation of a shear wave provided by an embodiment of the present application. As shown in FIG. 4, after the configuring, by the second processing module 12, a control parameter for the master processing module 111 and the slave processing module 112, this embodiment may further include a method of excitation of a shear wave as follows.

At step 401, the second processing module 12 sends an excitation instruction to the master processing module 111.

At step 402, the master processing module 111 generates a second synchronization signal based on the excitation instruction, and sends the second synchronization signal to the synchronous distribution module 13, so that the synchronous distribution module 13 sends the second synchronization signal to the master processing module 111 and the slave processing module 112 in the first processing module 11.

At step 403, the slave processing module 112 and the master processing module 111 control the array elements to which they are respectively connected to generate the shear wave according to the first parameter, on the basis of the second synchronization signal.

Exemplarily, in the embodiment shown in FIG. 4, prior to sending the excitation instruction to the master processing module 111, the second processing module 12 may configure communication ports of the master processing module 111 and the slave processing module 112, so as to specify the ports, of the master processing module 111 and the slave processing module 112, which are connected with the array elements.

Furthermore, after completing the configuration of the communication ports, the second processing module 12 configures the master processing module 111 and the slave processing module 112 with the first parameter for generating the shear wave, where the first parameter may include, but is not limited to the following data: a time duration and a vibration frequency of the shear wave generated by continuous vibration, the time duration may be between 1 μs and 1 s, and the vibration frequency may be between 10 Hz and 100,000,000 Hz.

After completing the configuration of the first parameter, if the excitation instruction is received by the master processing module 111 from the second processing module 12, the master processing module 111 generates a second synchronization signal based on the excitation instruction from the second processing module 12, and distributes the second synchronization signal to the master processing module 111 and the slave processing module 112 in the first processing module 11 through the synchronous distribution module 13. After receiving the second synchronization signal, the master processing module 111 and the slave processing module 112 in the first processing module 11 control the array elements to which they are respectively connected to generate the shear wave in one of the following manners: single-point acoustic radiation force impulse, multi-point Mach cone, multi-point comb wave, and multi-point surface wave. In this case, the time duration of the shear wave generated by continuous vibration may be, for example, 60 μs, and the vibration frequency may be, for example, 2,400,000 Hz. The movement speed of tissues caused by the shear wave may be, for example, 1 m/s, and the movement range of tissues caused by the shear wave may be, for example, 1 mm. Certainly, this is only a description of the shear wave, not an unique limitation.

At step 304, the second processing module 12 processes the echo signal collected to obtain information about the biological signs of an organism.

Exemplarily, after obtaining the echo signal, the second processing module 12 first separates the shear wave carrying information about the biological signs of an organism from the echo signal. Furthermore, the second processing module 12 then parses the shear wave to obtain the information about the biological signs of the organism based on a preset processing method. In this case, methods for separating the shear wave from the echo signal, and methods for parsing the shear wave to obtain the information about the biological signs of the organism may refer to the related art, which will not be repeated herein.

In this embodiment, the second processing module 12 is configured to send a detection instruction to the master processing module 111 in the first processing module 11, and the master processing module 111 generates a first synchronization signal based on the detection instruction, and sends the first synchronization signal to the synchronous distribution module 13, so that the synchronous distribution module 13 transmits the first synchronization signal to the master processing module 111 and the slave processing module 112 in the first processing module 11, and so the slave processing module 112 and the master processing module 111 are capable of controlling array elements to which they are respectively connected to transmit an ultrasonic wave simultaneously based on the first synchronization signal, and collect an echo signal; and accordingly the second processing module 12 processes the echo signal collected by each array element to obtain information about the biological signs of an organism. Since this embodiment may simultaneously send ultrasonic waves through multiple array elements, and process echo signals collected by multiple array elements, the organism may be detected in multiple dimensions simultaneously, thereby improving the detection efficiency.

Figure 5:
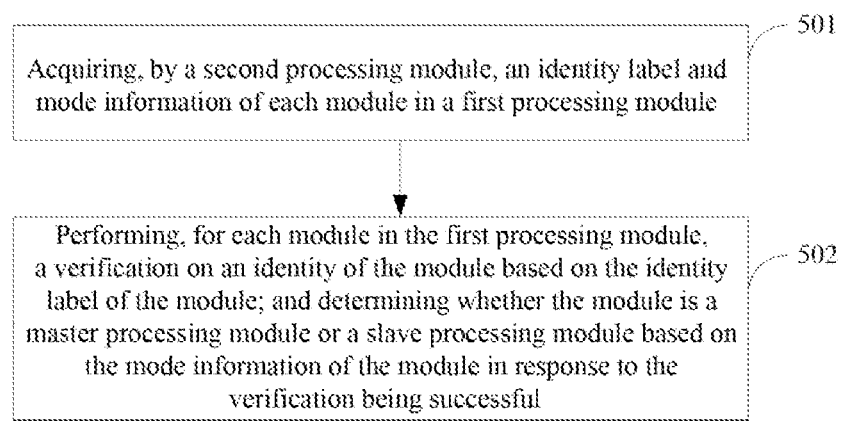
FIG. 5 is a flow chart of a method for identifying a master processing module and a slave processing module provided by an embodiment of the present application.

In one embodiment of the present application, before the second processing module 12 sends the detection instruction to the master processing module 111, or configures the control parameter for the master processing module 111 and the slave processing module 112, a method for identifying the master processing module 111 and the slave processing module 112 may be included. In such method, the second processing module 12 acquires identity information of each module in the first processing module 11, and identifies the master processing module 111 and the slave processing module 112 based on the identity information of each module; where the identity information described in this embodiment includes an identity label and pattern information. Exemplarily, FIG. 5 is a flow chart of a method for identifying a master processing module 111 and a slave processing module 112 provided by an embodiment of the present application. As shown in FIG. 5, the method includes the following steps.

At step 501, the second processing module 12 acquires an identity label and pattern information of each module in the first processing module 11.

In this embodiment, an operating mode corresponding to the master processing module 111 is a master mode, an operating mode corresponding to the slave processing module 112 is a slave mode, and the pattern information of the module is used to indicate that whether the operating mode of the module is the master mode or the slave mode.

In this embodiment, the identity label of each module is unique. Exemplarily, the identity label described in this embodiment may include at least one of the following labels: a manufacturer identification code, a device identification code, and an auxiliary identification code.

At step 502, for each module in the first processing module 11, an identity of the module is subjected to verification based on the identity label of the module, and in response to the verification being successful, it is determined that the module is the master processing module 111 or the slave processing module 112 based on the mode information of the module.

Exemplarily, in a feasible implementation, the second processing module 12 may first acquire the identity label of each module from the first processing module 11; if it is detected that the identity labels of these modules are pre-stored in the second processing module 12, the second processing module 12 then acquires the mode information of each module from the first processing module 11, so as to determine that each module is the master processing module 111 or the slave processing module 112 based on the mode information of each module.

In another feasible implementation, the second processing module 12 may also acquire both the identity label and the mode information of each module in the first processing module 11 in single acquisition action. Furthermore, the second processing module 12 verifies the identity label of each module, if the verification is successful; it is further determined that each module is the master processing module 111 or the slave processing module 112 based on the mode information of each module.

In some implementations, the second processing module 12 may also acquire address information of each module while acquiring the mode information of each module, so as to bind the mode and address of each module together after the master processing module 111 and the slave processing module 112 are determined, thereby facilitating message transmission.

In some implementations, the second processing module 12 may identify the identity and mode of each module in the first processing module 11 one by one, in such way, the second processing module 12 acquires a relatively small amount of data at a time, and occupies less transmission resource. Alternatively, in other implementations, the second processing module 12 may also simultaneously identify the identities and modes of all modules in the first processing module 11, which can reduce the number of interactions between the second processing module 12 and the first processing module 11, and have relatively high identification efficiency.

Additionally, in some implementations, a user may also expand or delete the modules in the first processing module 11. For example, in some possible scenarios, the second processing module 12 monitors its own communication ports. When detecting that a new module in the first processing module 11 is connected with its own idle communication port, the second processing module 12 sends query information to the newly connected module through the communication port, and receives the identity label and the mode information returned by the newly connected module, and accordingly identifies the operating mode of the newly connected module based on the received mode information. For example, when the newly connected module is a slave processing module 112, the second processing module 12 records the operating mode corresponding to the identity label of the module as a slave mode; or, when the newly connected module is a master processing module 111, the second processing module 12 first detects whether the current first processing module 11 includes a master processing module 111, if not, the operating mode corresponding to the identity label of the newly connected module is recorded as a master mode; and if so, an error message is fed back. Certainly, this is just an example for description, rather than a unique limitation to the present application.

For another example, in other possible scenarios, the second processing module 12 may also monitor the connection condition of the master processing module 111 and the slave processing module 112 currently connected. If it is detected that there is a master processing module 111 or a slave processing module 112 that is disconnected, a reconnection may be attempted firstly, and if the reconnection fails, the currently stored data of the module will be deleted.

In this embodiment, by identifying the identity and mode of each module in the first processing module 11 before the detecting of the information about the biological signs of an organism, the accurate performance of the detection operation may be guaranteed. At the same time, an expansion mechanism and a deletion mechanism of modules can achieve the flexible increase or decrease of the master processing module 111 and/or the slave processing module 112, so that the ultrasonic detection system can adapt to the requirements of different detection tasks.

The wordings used in the embodiments of the present application are only intended for describing the embodiments rather than limiting the present disclosure. As used in the description of the embodiments and the claims, singular forms including "a", "an" and "the" are intended to include the plural form as well, unless the context clearly defines otherwise. Similarly, the term "and/or" as used in the present application is meant to include any of one or more of the associated items listed, and all possible combinations thereof. Additionally, when used in the present application, the term "comprise/include" and its variants "comprises/includes" and/or "comprising/including" refer to the presence of stated features, entireties, steps, operations, elements, and/or components, however, the presence or addition of one or more other features, entireties, steps, operations, elements, components and/or groups thereof is not excluded.

Various aspects, embodiments, implementations, or features of the embodiments described in the present application may be used alone or in any combination. Various aspects of the described embodiments may be implemented by software, hardware, or a combination of software and hardware. The described embodiments may also be embodied by a computer readable medium which stores computer readable codes, and the computer readable codes include instructions that are executable by at least one computing device. The computer readable medium may be associated with any data storage device capable of storing data that are readable by a computer system. For example, the computer readable medium may include read only memory (ROM), random access memory (RAM), compact disc-read only memory (CD-ROM), hard disk drive (HDD), and digital versatile disc (DVD), magnetic tape, optical data storage, and the like. The computer readable medium may also be distributed in a computer system connected via a network, so that the computer readable codes may be stored and executed in a distributed fashion.

The above technical description may be made with reference to the drawings, which form a portion of the present application, and by way of description, implementations in accordance with the described embodiments are shown in the drawings. Although these embodiments are described in sufficient detail to enable those skilled in the art to implement these embodiments, these embodiments are non-limiting; in this way, other embodiments may be used, and modifications may be made without departing from the scope of the described embodiments. For example, the order of operations described in a flow chart is non-limiting, and thus the order of two or more operations illustrated in the flow chart and described in accordance with the flow chart may be altered according to several embodiments. As another example, in several embodiments, one or more operations illustrated in the flow chart and described in accordance with the flow chart are optional, or may be deletable. Additionally, some steps or functions may be added to the disclosed embodiments, or the order of two or more steps may be replaceable. All these modifications are considered to be included in the disclosed embodiments and claims.

What is claimed is:

1. A method for detecting biological signs based on an ultrasonic detection system, wherein the ultrasonic detection system comprises an ultrasonic probe, a first processor, a second processor and a synchronous distributor; wherein the ultrasonic probe comprises at least two array elements, and the first processor comprises a master controller and at least one slave controller; the method comprising:
    sending, by the second processor, a detection instruction to the master controller;
    generating, by the master controller, a first synchronization signal based on the detection instruction, and sending the first synchronization signal to the synchronous distributor, so as to make the synchronous distributor send the first synchronization signal to the master controller and the slave controller in the first processor;
    controlling, by the slave controller and the master controller, the array elements respectively connected with the slave controller and the master controller to transmit an ultrasonic wave that is used to detect a shear wave based on the first synchronization signal, and collecting at least 20 frames of an echo signal of the ultrasonic wave; wherein the echo signal has a pulse repetition frequency within a range of 10 Hz-40,000 Hz; and
    processing, by the second processor, the echo signal collected to obtain information about biological signs of an organism.

2. The method according to claim 1, wherein before the sending, by the second processor, the detection instruction to the master controller, the method further comprises:
    configuring, by the second processor, a control parameter for the master controller and the slave controller, so as to make the master controller and the slave controller control the array elements to which they are respectively connected based on the control parameter.

3. The method according to claim 2, wherein the control parameter comprises a first parameter for controlling the array elements to generate the shear wave.

4. The method according to claim 3, wherein after the configuring, by the second processor, the control parameter for the master controller and the slave controller, the method further comprises:
    sending, by the second processor, an excitation instruction to the master controller;
    generating, by the master controller, a second synchronization signal based on the excitation instruction, and sending the second synchronization signal to the synchronous distributor, so as to make the synchronous distributor send the second synchronization signal to the master controller and the slave controller in the first processor; and
    controlling, by the slave controller and the master controller, the array elements respectively connected with the slave controller and the master controller to generate the shear wave based on the first parameter, on the basis of the second synchronization signal.

5. The method according to claim 4, wherein the controlling, by the slave controller and the master controller, the array elements respectively connected with the slave controller and the master controller to generate the shear wave is implemented in one of following manners:
    single-point acoustic radiation force impulse, multi-point Mach cone, multi-point comb wave, and multi-point surface wave.

6. The method according to claim 4, wherein the shear wave generated based on the first parameter has a time duration between 1 μs and 1 s and a vibration frequency between 10 Hz and 100,000,000 Hz.

7. The method according to claim 2, wherein the control parameter comprises a second parameter for controlling the array elements to generate the ultrasonic wave.

8. The method according to claim 2, wherein before the configuring, by the second processor, the control parameter for the master controller and the slave controller, the method further comprises:
    acquiring, by the second processor, identity information of each controller in the first processor, and identifying the master controller and the slave controller based on the identity information of each controller.

9. The method according to claim 3, wherein before the configuring, by the second processor, the control parameter for the master controller and the slave controller, the method further comprises:
    acquiring, by the second processor, identity information of each controller in the first processor, and identifying the master controller and the slave controller based on the identity information of each controller.

10. The method according to claim 4, wherein before the configuring, by the second processor, the control parameter for the master controller and the slave controller, the method further comprises:
    acquiring, by the second processor, identity information of each controller in the first processor, and identifying the master controller and the slave controller based on the identity information of each controller.

11. The method according to claim 5, wherein before the configuring, by the second processor, the control parameter for the master controller and the slave controller, the method further comprises:
    acquiring, by the second processor, identity information of each controller in the first processor, and identifying the master controller and the slave controller based on the identity information of each controller.

12. The method according to claim 8, wherein the identity information comprises an identity label and mode information;
    the identifying the master controller and the slave controller based on the identity information of each controller comprising:
    performing, for each controller in the first processor, a verification on an identity of the controller based on the identity label of the controller; determining whether the controller is the master controller or the slave controller based on the mode information of the controller in response to the verification being successful, and feeding back an error message in response to that the verification fails;
    the mode information is used to indicate that whether an operating mode of the controller is a master mode or a slave mode.

13. The method according to claim 12, wherein the identity information comprises at least one of the following:

a manufacturer identification code, a device identification code, and an auxiliary identification code.

14. The method according to claim 9, wherein the identity information comprises an identity label and mode information;
the identifying the master controller and the slave controller based on the identity information of each controller comprising:
performing, for each controller in the first processor, a verification on an identity of the controller based on the identity label of the controller; determining whether the controller is the master controller or the slave controller based on the mode information of the controller in response to the verification being successful, and feeding back an error message in response to that the verification fails;
the mode information is used to indicate that whether an operating mode of the controller is a master mode or a slave mode.

15. The method according to claim 14, wherein the identity information comprises at least one of the following:
a manufacturer identification code, a device identification code, and an auxiliary identification code.

16. The method according to claim 10, wherein the identity information comprises an identity label and mode information;
the identifying the master controller and the slave controller based on the identity information of each controller comprising:
performing, for each controller in the first processor, a verification on an identity of the controller based on the identity label of the controller; determining whether the controller is the master controller or the slave controller based on the mode information of the controller in response to the verification being successful, and feeding back an error message in response to that the verification fails;
the mode information is used to indicate that whether an operating mode of the controller is a master mode or a slave mode.

17. The method according to claim 16, wherein the identity information comprises at least one of the following:
a manufacturer identification code, a device identification code, and an auxiliary identification code.

18. The method according to claim 11, wherein the identity information comprises an identity label and mode information;
the identifying the master controller and the slave controller based on the identity information of each controller comprising:
performing, for each controller in the first processor, a verification on an identity of the controller based on the identity label of the controller; determining whether the controller is the master controller or the slave controller based on the mode information of the controller in response to the verification being successful, and feeding back an error message in response to that the verification fails;
the mode information is used to indicate that whether an operating mode of the controller is a master mode or a slave mode.

19. The method according to claim 18, wherein the identity information comprises at least one of the following:
a manufacturer identification code, a device identification code, and an auxiliary identification code.

20. The method according to claim 1, wherein the ultrasonic detection system further comprises a mechanical vibration device;
before the sending, by the second processor, the detection instruction to the master controller, the method further comprising:
sending, by the second processor, an excitation signal to the mechanical vibration device, so as to make the mechanical vibration device generate a shear wave.

* * * * *